(12) United States Patent
Yannam et al.

(10) Patent No.: US 11,989,115 B2
(45) Date of Patent: May 21, 2024

(54) AGENT-SIDE CHATBOT SIMULATOR WITH THROTTLING CAPABILITIES

(71) Applicant: Bank of America Corporation, Charlotte, NC (US)

(72) Inventors: Ramakrishna R. Yannam, The Colony, TX (US); Martin Goettmann, Flower Mound, TX (US)

(73) Assignee: Bank of America Corporation, Charlotte, NC (US)

( * ) Notice: Subject to any disclaimer, the term of this patent is extended or adjusted under 35 U.S.C. 154(b) by 101 days.

(21) Appl. No.: 17/751,910

(22) Filed: May 24, 2022

(65) Prior Publication Data
US 2023/0385180 A1 Nov. 30, 2023

(51) Int. Cl.
*G06F 9/44* (2018.01)
*G06F 11/36* (2006.01)

(52) U.S. Cl.
CPC ...... *G06F 11/3664* (2013.01); *G06F 11/3688* (2013.01)

(58) Field of Classification Search
CPC .................. G06F 11/3664; G06F 11/3688
See application file for complete search history.

(56) References Cited

U.S. PATENT DOCUMENTS

| | | | |
|---|---|---|---|
| 8,681,610 B1* | 3/2014 | Mukerji | H04L 47/323 370/229 |
| 2013/0136253 A1* | 5/2013 | Liberman Ben-Ami | H04M 3/5191 379/265.09 |
| 2019/0253368 A1* | 8/2019 | Kim | H04L 51/06 |
| 2019/0311036 A1* | 10/2019 | Shanmugam | G06F 40/56 |
| 2023/0036072 A1* | 2/2023 | Gao | G06N 5/022 |

* cited by examiner

*Primary Examiner* — Hang Pan
(74) *Attorney, Agent, or Firm* — Weiss & Arons LLP

(57) ABSTRACT

This application describes apparatus and methods for an agent-side simulator for testing chatbot systems. The agent-side simulator may be configured to mimic behavior of a human agent in a chatbot testing environment. The agent-side simulator may throttle the amount of data and the frequency of speed at which the data is processed by components of the chatbot system. The agent-side simulator may test how much data that can be processed by a chatbot system and the speed which a target volume of data can be processed by the chatbot system. The agent-side simulator may build an agent profiles for different chat conversations. A first agent profile may be used to simulate conversations that require slower response times. A second agent profile may be used to simulate conversations that require faster response times. The agent-side simulator may not perform chat session handling to minimize computing resources consumed by the agent-side simulator.

19 Claims, 6 Drawing Sheets

AGENT-SIDE CHATBOT SIMULATOR WITH THROTTLING CAPABILITIES

FIELD OF TECHNOLOGY

This application describes apparatus and methods for a testing environment that ensures chatbot applications meet threshold performance metrics.

BACKGROUND

A user may attempt to obtain information regarding a product or service using a variety of communication channels such as telephone or email. Currently, there are various automated tools that help users obtain information they seek. For example, a chatbot may be available to a user. A chatbot generally refers to a computer program that can have automated text or voice-based conversations with a user. Advancements in natural language processing have made it possible for chatbots to hold longer, deeper and more natural automated conversations with users.

A chatbot may prompt a user to enter a question or chose from a menu of pre-populated question options. In response to input received from the user, the chatbot may attempt to decipher the user's question and provide a relevant response. A chatbot may use a variety of computational techniques to discern a meaning of user inputs and efficiently address the user's concern. Chatbots may be powered by pre-programmed responses, artificial intelligence ("AI") in order to answer questions without involving a human agent.

In order to ensure that a chatbot provides appropriate assistance and relevant responses to users, chatbots are vigorously tested. Such tests may confirm that the chatbot provides a threshold level of accuracy and quality control. During testing, chatbots may interact with numerous back-end systems in order to retrieve data and logic necessary to power automated responses provided by the chatbot. It is possible to partially automate testing of automated chatbot interactions. For example, test inputs may be auto-generated and submitted to the chatbot system.

Automated outputs generated by the chatbot system in response to test inputs can be monitored and evaluated. The chatbot system may also be evaluated to determine how many concurrent automated conversations can be maintained without the chatbot system crashing or providing irrelevant responses. Based on activity of the chatbot, computing resources may be allocated to achieve a target performance level.

However, a chatbot may also provide tools for linking a user to a human agent. For example, a chatbot may not be able to discern the purpose or goal of a user. In such scenarios, the chatbot may link the caller to a human agent. In some cases, the user may request to be connected with a human agent. In some cases, the chatbot may be configured to determine whether and when to transfer a caller to a human agent.

When a user interacts with a human agent it is difficult to test performance of the underlying communication and computer systems that link the user to the human agent. Human agents do not all communicate in the same way. For example, some agents may respond faster than others. Some agents may write terse responses and other agents may write verbose responses. Some agents may be comfortable engaging in multiple concurrent conversations, while other agents may only engage with one user at a time. Additionally, different agents may be located in different geographic regions. Agents in each geographic regions may respond differently and users in different geographic locations may have different performance expectations.

As a result of the inconsistent and disparate behaviors of human agents and users it is notoriously difficult to test the performance capabilities of communication and computer systems that service user-agent conversations. It would be desirable to provide apparatus and methods for automated testing of communication and computer systems that service user-agent conversations. It would be desirable to provide apparatus and methods that ensure that adequate computing resources are allocated to user-agent conversations. It would be desirable to avoid unnecessarily allocating surplus computing resources to user-agent conversations. Accordingly, it is desirable to provide an AGENT-SIDE CHATBOT SIMULATOR WITH THROTTLING CAPABILITIES.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
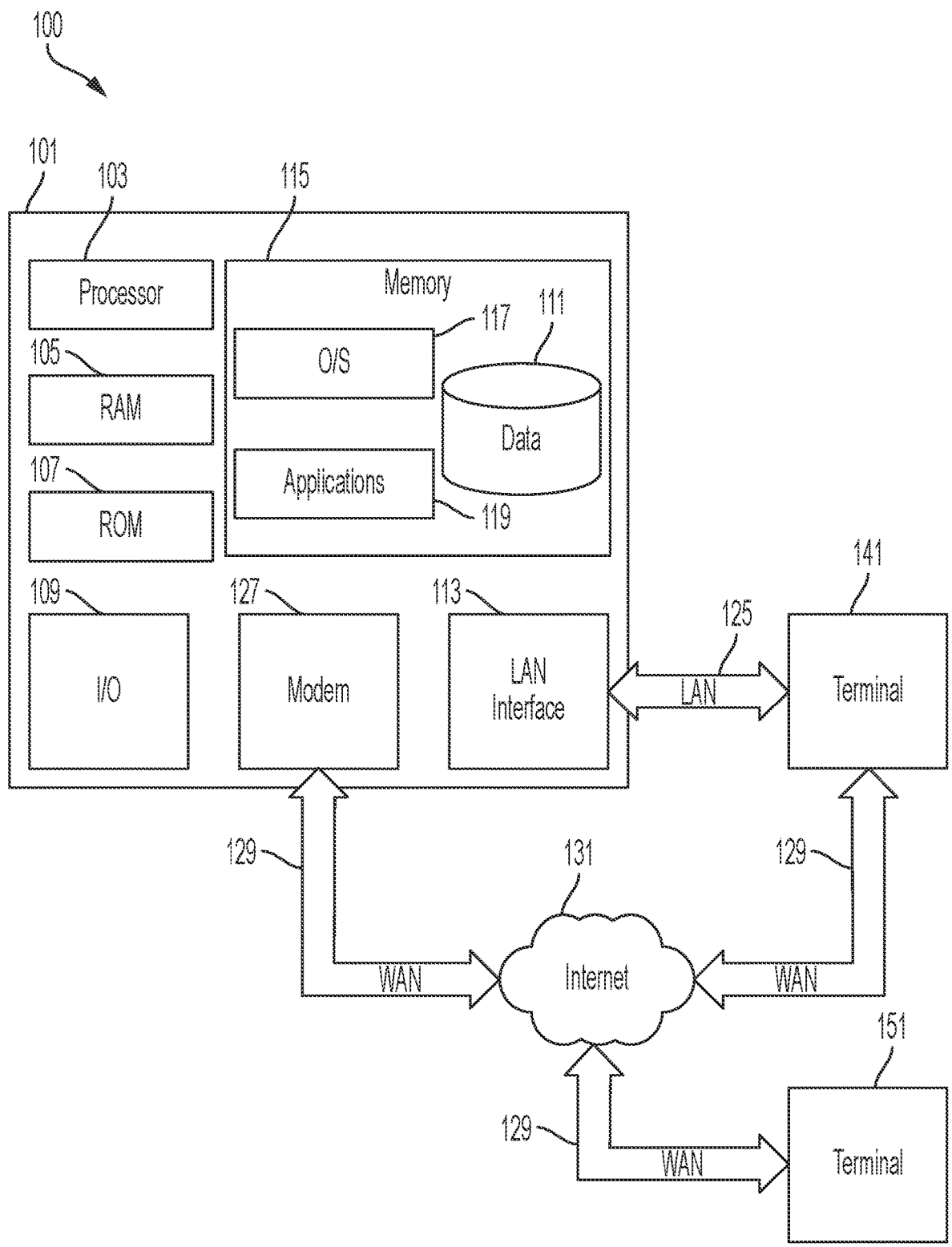
FIG. 1 shows an illustrative system in accordance with principles of the disclosure.

Apparatus for a simulator that performs automated testing response performance of a chatbot system is provided. The simulator may include computer executable instructions. The computer executable instructions, when executed by a processor on a computer system may cause the computer system to perform various functions. Some or all of the computer executable instructions may be embodied in software, firmware, hardware, or a combination thereof.

The simulator may include an agent-side simulator. The agent-side simulator may receive a submission from a user-side simulator. In some embodiments, the simulator may also include the user-side simulator. An agent-side simulator may generate a response to the simulated submission. The agent-side simulator may formulate a response configuration based on the simulated submission. The response configuration may define behavior of a simulated agent. The simulator may generate a simulated response based on the response configuration and thereby simulate a user-agent interaction.

The response configuration may be defined based on one or more control commands included in a submission. An illustrative control command may set a response delay. The response delay may instruct the simulator to wait a defined amount of time before responding to a submission. An illustrative control command may define how much information the simulator includes in its response. The simulator may generate a response that includes random characters. The random characters may provide the amount of information defined in a control command. An illustrative control command may indicate a submission is triggering a start of a simulated conversation. An illustrative control command may indicate a submission is ending a simulated conversation.

Each submission may include different control commands. The control commands may be generated by an AI engine. The AI engine may generate control commands that mimic real-world interactions between a user and a human agent. The AI engine may include computer programs that process datasets to enable problem-solving by computer systems. The AI engine may perform problem-solving tasks that normally require human-like intelligence. Illustrative AI computational algorithms utilized by the AI engine may include AdaBoost, Naive Bayes, Support Vector Machine, Random Forests, Artificial Neural Networks and Convolutional Neural Networks.

The AI engine may perform machine learning AI and deep learning AI. Machine learning AI may identify patterns in data sets and makes decisions based on the detected patterns. Machine learning AI is typically used to predict future behavior. Machine learning AI improves each time the AI system receives new data because new patterns may be discovered in the larger data set now available to the machine learning AI. However, even though predications by machine learning AI progressively improve over time, machine learning AI is limited to pre-programmed analysis of available data. Machine learning AI is not adaptable to look at available data in different ways or flag new patterns in available data. Machine learning AI follows a pre-programmed routine to search for pre-determined patterns in available data.

On the other hand, deep learning AI adapts when exposed to different patterns of data. Deep learning AI may uncover features or patterns in data that the deep learning AI was never specifically programmed to find. Deep learning AI is typically based on neural networks and require large amounts of processing power to train.

A neural network implements deep learning AI by passing an input through a network of neurons—called layers—and providing an output. The more layers of neurons that are included in the neural network, the "deeper" the neural network. A neural network learns from outputs flagged as erroneous and adapts its neuron connections such that the next time the neural network receives a particular input it generates a more relevant output.

To effectively provide relevant outputs, a neural network must first be trained by analyzing training data sets. Neural networks learn from the training data sets and rearrange interconnection between layer of the network in response to processing the training data. The strength or weight of a connection between layers of the neural network can vary. A connection between two or more layers can be strong, weak or anywhere in between. A neural network may self-adapt by adjusting the strength of the connections among its layers to generate more accurate outputs.

During a training of the neural network, connections between layers are repeatedly adjusted by exposing the network to training data sets. There may be thousands and millions of layers in a neural network and adjusting connections between the layers is a computationally intensive procedure. Intensive matrix-based mathematical procedures are performed to train the neural network.

Typically, training of a neural network is performed using clusters of servers that include Graphics Processing Units ("GPUs"). A GPU is hardware capable of performing concurrent math computations over large data sets. GPU's do not operate as fast as central processing units ("CPUs"). However, GPUs are capable of processing larger quantities of data per unit of time. Thus, even though each individual GPU operation may execute more slowly, the parallelism of applying computational operations to more data in parallel exceeds CPU performance, allowing deep learning AI system to be fully trained faster.

The training phase of neural network may require several iterations until outputs generated by the network are satisfactory and accurate. The data processed after the neural network is deployed can be fed back into the neural network to correct it or enhance it according to the latest trends detected in newly acquired data sets. Therefore, the process of training and retraining a neural network can occur iteratively over time. A neural network that is not retrained will eventually become inaccurate with respect to new data sets. After completing the training phase, the trained neural network may be deployed in a production environment on relatively less powerful computer systems than the GPU based servers used to train the neural network.

The simulator may include an AI engine that tracks live chatbot conversations. The live chatbot conversations may be training data processed by a neural network included in the AI engine. The AI engine may track live chatbot conversations between automated tools and users. The AI engine may track live chatbot conversations between human agents and users.

The AI engine may track live chatbot conversations across different human agents that each communicate in different ways. For example, some agents may respond faster than others. Some agents may write terse responses and other agents may write verbose responses. Some agents may be comfortable engaging in multiple concurrent conversations, while other agents may only engage with one user at a time. Additionally, different agents may be located in different geographic regions. Agents in each geographic regions may respond differently and user in different geographic locations may have different performance expectations.

Based on learning from the live chatbot conversations, the AI engine may generate simulated submissions and associated control commands that emulate realistic interactions between agents and users. Based on the simulated conversations generated by the AI engine, the simulator may test how many different user-agent conversations may be supported by available communication and computer systems.

Based on learning from the live chatbot conversations, the AI engine may generate a target volume of simulated chatbot conversations that define, collectively, a pattern of user-agent interactions. The AI engine may generate a target volume of simulated conversations that include randomly assigned control commands. For example, the AI engine may generate a target volume of simulated chatbot conversations that involve communication of a defined amount of data and are conducted with a define time window. The data amount or time window may be defined for an individual response message or for an overall conversation.

The simulator may include a computer communications protocol that provides full-duplex communication channels over a single Transmission Control Protocol ("TCP") connection. TCP includes a set of communication rules that govern delivery of data over the Internet or other network that uses the Internet. TCP allows data to be sent in individual segments of up to 1,500 bytes (including headers) in size.

The simulator may receive a simulated submission using the computer communications protocol. The simulator may transmit a simulated response (to the simulated submission) using the computer communications protocol. In some embodiments, the simulator may open a discrete communication connection for responding to each received submission. The simulator may close the discrete communication connection after transmitting each simulated chatbot response.

Each time the simulator transmits a response it may close the opened communication channel and release those communication resources. Thus, the simulator itself may not include any session handling programming and may not require computing resources to implement session handling. The ability to function without session handling may reduce the amount of computer resources needed to operate the simulator. In such embodiments, the simulator may test the volume of data throughput that can be processed by a chatbot system. In such embodiments, the simulator may test how fast and how reliably the chatbot system may process a target volume of data.

For example, a simulated submission generated by a user-side simulator may be one of a plurality of simulated submissions. The plurality of simulated submissions may be received by an agent-side simulator. For each of the submissions, the agent-side simulator may open a discrete connection for responding to one of the plurality of submissions. After transmitting the simulated chatbot response for the one of plurality of submissions, the agent-side simulator may close the discrete connection. Opening and closing the discrete connection for responding to each submission reduces processing power consumed by the agent-side simulator and allows the agent-side simulator to respond to a larger number of simulated submissions.

As a result of opening and closing connections, the agent-side simulator may process a threshold number of submissions that exceeds a maximum number of default submissions a chatbot is configured to process. The agent-side simulator may process the threshold number of submissions using less powerful hardware than would be needed had the agent-side simulator also needed to implement session handling.

The agent-side simulator may be capable of processing a plurality of submissions that overload a processing capability of a chatbot system. An illustrative chatbot system may include a mobile device application. The mobile application may be installed on a user's mobile device. The mobile application may provide the user access to the chatbot system. Interactions between mobile device application and the other chatbot system components may be mediated by a mobile gateway. The mobile gateway may be an internal enterprise application that exposes web services to the mobile application. The mobile gateway may provide user authentication and protection for enterprise systems.

The user may use mobile device application to interact with an intelligent conversation hub ("ICH"). The ICH may be a front facing web application for an interactive response system such as a chatbot. The ICH may access a natural language processor to determine user intent and extract meaning from user inputs. For example, if a user enters "I need help with a dispute," the natural language processor may understand the intent as "need assistance" and the topic/entity as "filing a dispute."

The ICH may receive a user request for a transfer to a live agent. The ICH may access an agent availability service to identify an agent. After identifying an agent, the ICH may orchestrate a protocol handshake and pass context or history of prior session activity to the agent. Session handling may include securing multiple requests to a service from the same user or entity. Session handling may include passing context or history of prior session activity to an agent interface. The handshake may include a Hypertext Transfer Protocol Secure ("HTTPS") request and may enable the server to handle HTTPS and WebSocket ("WSS") connections on the same port.

Once the connection is established, the communication may switch to WSS protocols. WSS protocols may enable interaction between a client application and a web server using a bidirectional binary protocol, which does not conform to HTTPS protocol. The agent may conduct a conversation with the user via an agent interface.

Collective response configurations associated with the plurality of simulated submissions may overload communication and computer power of a chatbot system. Overloading the chatbot system may cause the chatbot system to crash or otherwise fail to provide responses to user inquires. The collective response configurations associated with the plurality of simulated submissions may simulate overloading of the chatbot system by causing the chatbot system to process more than a threshold limit of data per second.

Overloading the chatbot system may cause the chatbot system to drop at least one of the plurality of simulated submissions. Dropping a submission may refer to a submission that does not receive a response from the agent-side simulator or is not received by the agent-side simulator. In a production environment, dropping a submission may correspond not providing a response to a user inquiry. The simulator may detect when the chatbot system crashes. The simulator may determine whether the chatbot system is likely to crash.

A computer executable method for simulating testing of chatbot response performance is provided. The method may include extracting computer readable instructions stored on a non-transitory medium. The method may include executing the computer readable instructions on a processor of a computer system. Execution of the computer readable instructions by the processor may implement one or more steps of the method.

The method may include receiving a computer-generated submission. Receipt of the computer-generated submission may trigger initiation of a simulated chatbot conversation. The method may include extracting a response configuration from the computer-generated submission. The method may include generating a simulated chatbot response to the computer-generated submission by throttling the simulated chatbot conversation based on the response configuration.

The response configuration may define a time delay between receiving the computer-generated submission and transmitting a simulated chatbot response. The computer-generated submission may be a first computer-generated submission. The response configuration extracted from the first computer-generated submission may define the time delay applied by the simulator based on a duration of time between receiving the first computer-generated submission and receiving a second computer-generated submission. The response configurations for a plurality of submissions may cause the simulator to mimic behavior of a human agent during the simulated conversation.

The response configuration may include an instruction to end the simulated conversation. The instruction to end the simulator conversation may trigger a standard sign off message from the simulated agent. The simulator may generate a response that includes the same amount of data as the standard sign off message. The response configuration may define a delay between receiving the computer-generated submission and initiating transmission of a preliminary response. The preliminary response may include an agent activity status. The preliminary response may simulate an indicator that would typically be provided informing a user that an agent has begun typing a response to the user's inquiry.

The response configuration may define a time delay based on a size of the computer-generated submission. The simulator may include an AI engine that determines a typical user submission includes 5-7 words or 120-150 bytes of data. The AI engine may also determine that a typical agent response includes 2-4 sentences. To simulate an agent response, the simulator may define a time delay based on the amount of data included in a received test submission. The more data included in the test submission, the longer it will likely take a live agent to formulate and type a response. Accordingly, to simulate this agent behavior, the simulator will define a longer time delay for larger submissions.

A development environment ("dev environment") for simulating performance of a chatbot system is provided. The dev environment may include a user-side simulator. The dev environment may include an agent-side simulator. The dev environment may include computer executable instructions, that when executed by a processor on a computer system simulate interactions between a user and agent. The simulated interactions may utilize one or more components of a chatbot system.

The simulated interactions may include receiving a simulated submission from the user-side simulator. The user-side simulator may apply an AI engine to auto-generate a plurality of submissions that simulate human user interaction with a chatbot system. The dev environment may open a communication channel to the user-side simulator. The communication channel may be a wired channel. The communication channel may be a wireless channel. The communication channel may be a full-duplex communication channels over a single TCP connection.

The dev environment may determine a response profile. The response profile may be determined based on content of the simulated submission. For example, the simulated submission may include a response configuration that defines a target response profile. A response profile may be determined by an AI engine. The AI engine may monitor live interactions of a target agent. Based on the monitoring, the AI engine may determine a response profile for the target agent.

The dev environment may include an agent-side simulator that generates a simulated chatbot response to the simulated submission based on the response profile. After generating the response, the dev environment may close the communication channel between the user-side and agent-side simulators.

The response profile may cause the agent-side simulator to respond as if a target agent has formulated the response to the simulated submission. The agent-side simulator may allow the response profile of the target agent to be tested at scale. For example, the agent-side simulator may generate simulated responses to 10,000 test submission. Each of the simulated responses may be generated as if 10,000 agents all responded in accordance with the response profile of the target agent.

The simulated submission may be one of a plurality of simulated submissions. The simulated chatbot response may be one of a plurality of simulated chatbot responses. The plurality of simulated submissions received from the user-side simulator and the plurality of simulated chatbot responses provided by the agent-side simulator may collectively simulate a chatbot conversation. The simulated chatbot conversation may be a complete human-to-human chatbot conversation. The simulated chatbot conversation may be a human-to-machine chatbot conversation.

The response profile associated with a simulated chatbot conversation may define a time delay after receiving a corresponding simulated submission and before the agent-side simulator transmit a simulated chatbot response. The response profile associated with a chatbot conversation may define an amount of data included in each simulated chatbot response generated by the agent-side simulator. The dev environment may test whether the chatbot system can process the simulated chatbot conversation without dropping submissions and providing simulated responses in accordance with the response profile.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms described herein below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may store information in machine-readable data structures. The processor 103 may also execute software running on computer 101. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory. Any information described in connection with data 111, and any other suitable information, may be stored in memory 115.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output.

System 100 may be connected to other systems via a local area network ("LAN") interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a LAN 125 and a wide area network ("WAN") 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. A web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions. Application program(s) 119 (which may be alternatively referred to herein as "plugins," "applications," or "apps") may include computer executable instructions for invoking functionality related to performing various tasks.

Application program(s) 119 may utilize one or more algorithms that process received executable instructions, perform power management routines or other suitable tasks. Application program(s) 119 may utilize one or more AI systems and models described herein. Application program(s) 119, which may be used by computer 101, may include computer executable instructions for invoking functionality related to communication, such as e-mail, Short Message Service (SMS), and voice input and speech recognition applications.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user mobile devices. Terminals 141 and 151 may be identical to system 100 or different. The differences may be related to hardware components and/or software components.

This disclosure may be operational with numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
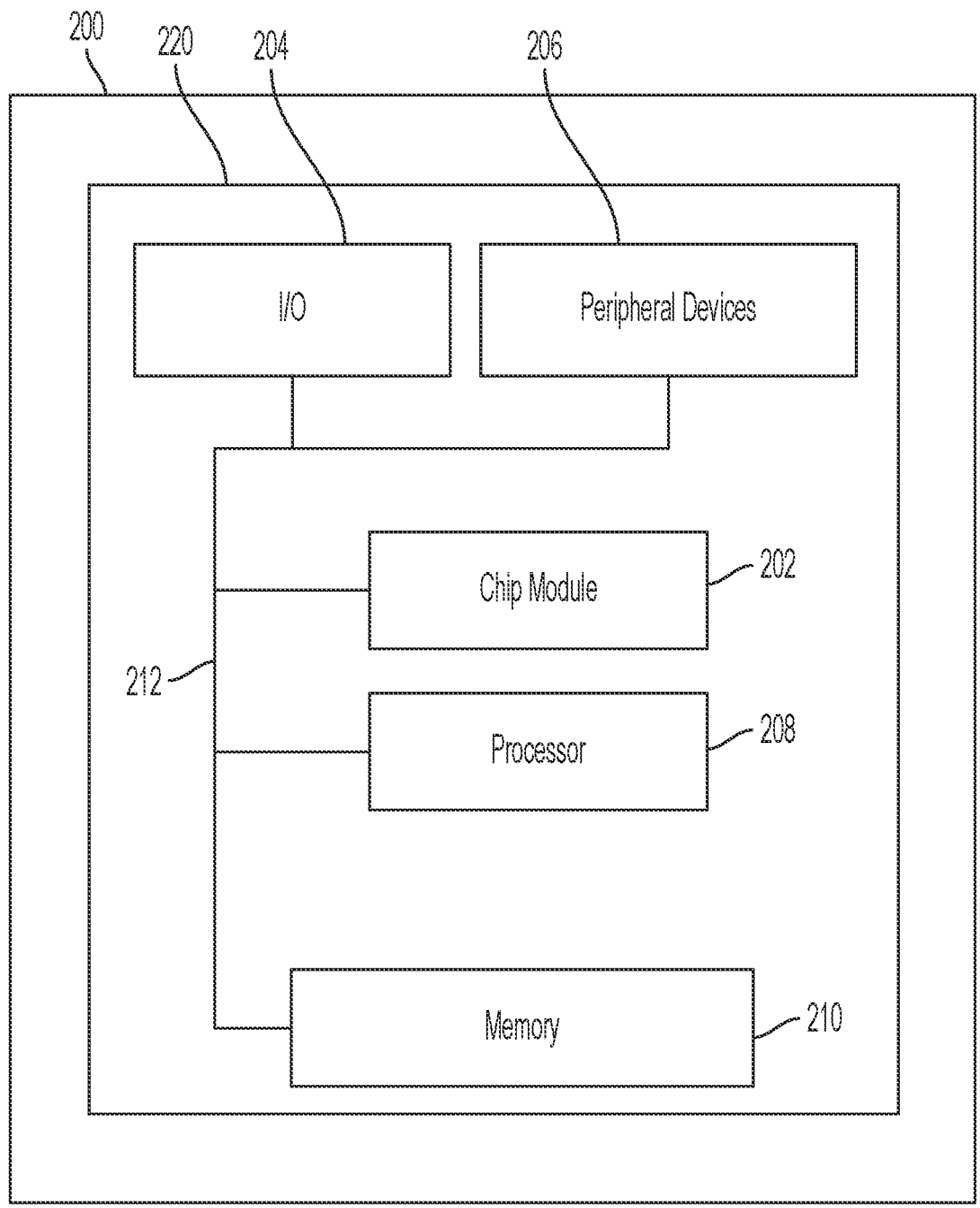
FIG. 2 shows an illustrative system in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 1. Apparatus 200 may include chip module 202, which may include one or more integrated circuits. Chip module 202 may be a GPU or configured to perform any other suitable logical operations.

Apparatus 200 includes processor 208, which may include one or more integrated circuits which includes logic configured to process executable instructions associated with an application. Processor 208 which may compute data structural information and structural parameters of the data. Applications executed by chip module 202 or processor 208 may be stored in machine-readable memory 210.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, one or more of components 202, 204, 206, 208 and 210 may be integrated into a single chip. The chip may be silicon-based.

Figure 3:
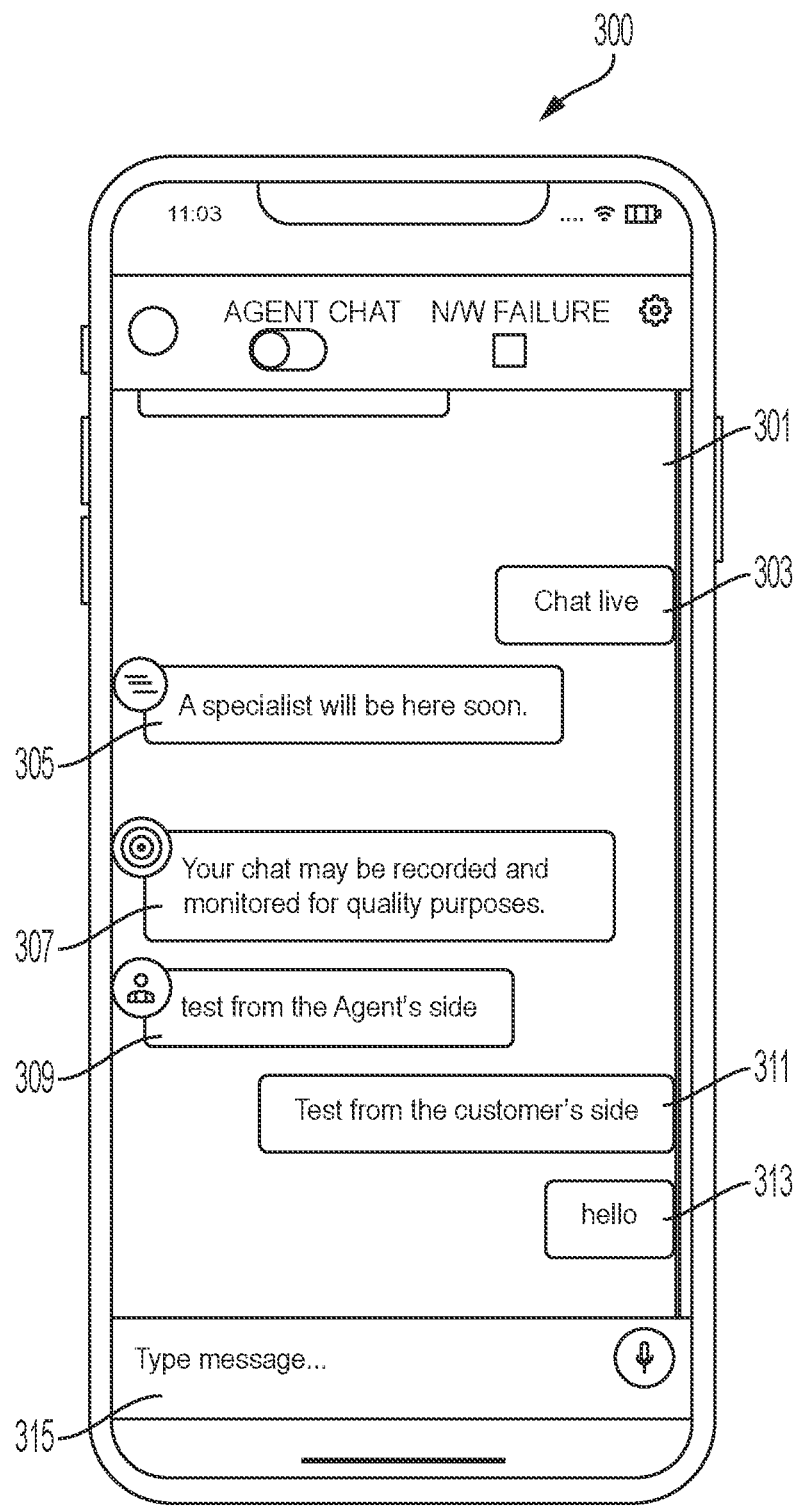
FIG. 3 shows illustrative operation of a system in accordance with principles of the disclosure.

FIG. 3 shows illustrative simulated chat conversation 300. Chat conversation 300 is shown on mobile interface 301. Mobile interface 301 displays a view of simulated chat conversation 300 from a user's perspective. Submission 303 shows that a simulated user has initiated a chat conversation. Responses 305 and 307 show automated agent responses that has been generated by an agent-side simulator. Response 309 shows an automated response that has been generated by the agent-side simulator based on a response configuration included in submission 303.

Simulated chat conversation 300 shows that submission 311 has been generating by a user-side simulator. Submission 311 includes five words. Chat conversation 300 shows that submission 313 has been generated by the user-side simulator. Submission 313 includes just one word. Submission 311 has a larger data size than submission 313. Chat conversation 300 shows that based on a response configuration included in submission 303 and/or submission 311, the agent-side simulator has not responded to submission 311 before submission 313 has been generated and transmitted to the agent-side simulator.

Mobile interface 301 includes manual input screen 315. Manual input screen 315 allows for an input to be entered manually. A manually entered input may include a response configuration. The manually entered input may include a response configuration that classifies it as an agent response. The manually entered input may include a response configuration that classifies it as a user submission. The manually entered input may override any previously generated response configurations formulated by an agent-side simulator (e.g., when submitted as an agent response) or a user-side simulator (e.g., when submitted as a user submission).

Figure 4:
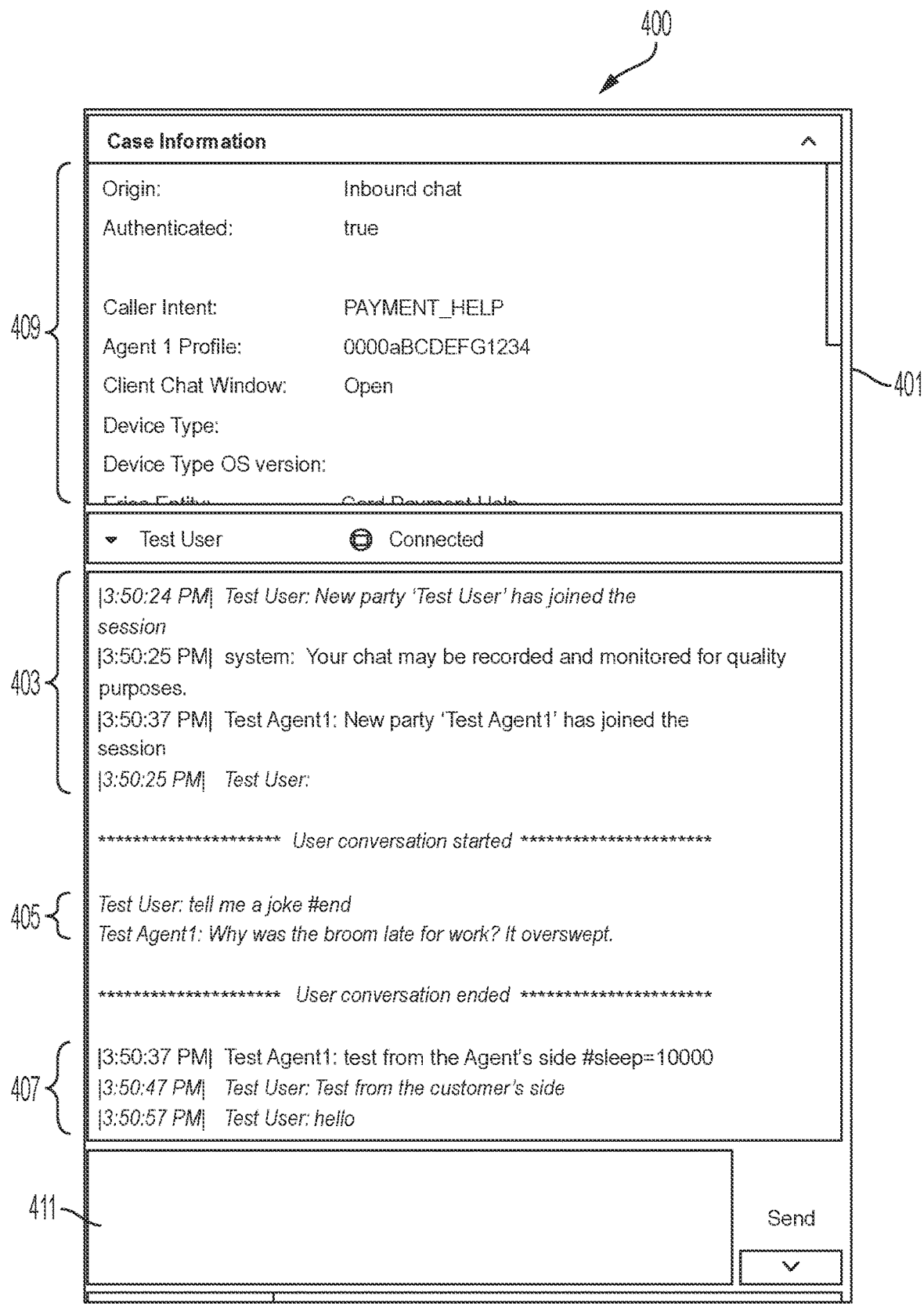
FIG. 4 shows illustrative operation of a system in accordance with principles of the disclosure.

FIG. 4 shows an illustrative agent-side view of simulated chat conversations 400. FIG. 4 shows how simulated chat conversations 400 are presented by an agent-side system. Chat conversations 400 are presented within agent interface 401. Agent interface 401 displays a view of simulated chat conversations 400 from an agent's perspective. Simulated chat conversations 400 may be generated by an AI engine. The AI engine may include a user-side simulator that generates simulated user submissions. The AI engine include an agent-side simulator that generates simulated agent responses to the simulated user submissions.

Agent interface 401 shows case information 409 associated with a simulated Test Agent1 managing chat conversations 400. Case information 409 shows that simulated Test Agent1 is associated with an agent profile "0000aBCDEFG1234." The agent profile may control how the AI engine generates simulated agent responses. For each simulated agent response, the AI engine may generate control commands that mimic real-world behavior of a target agent defined by the agent profile.

FIG. 4 shows that simulated chat conversations 400 are associated with tracking information 403. Tracking information 403 shows when a user-side simulator has started a simulated chat conversation. Tracking information 403 shows when an agent-side simulator (e.g., Test Agent1) has joined the simulated chat conversation.

FIG. 4 shows that simulated chat conversations 400 are associated with simulated chat conversation data 405. Simulated conversation data 405 shows simulated submission "tell me a joke #end" provided by a user-side simulator. The simulated submission may be generated by an AI engine based on the agent profile "0000aBCDEFG1234." The simulated submission includes control command "#end." The control command instructs the agent-side simulator to end the chat conversation after generating a response to the simulated user submission.

Simulated conversation data 405 shows that the agent-side simulator has generated simulated response "Why was the broom late? It overswept." The simulated response may be generated by the AI engine based on the agent profile "0000aBCDEFG1234." The simulated response may include a target number of characters corresponding to a data size of responses characteristic of a live agent exhibiting the agent profile "0000aBCDEFG1234."

For example, if an agent profile for Test Agent2 was active, the AI generator may generate the following two simulated responses in response to the submission "tell me a joke #end":

Test Agent2: A clown held the door for me today.
Test Agent2: It was a nice jester The simulated response provided by Test Agent2 are more verbose and include a larger data size. The simulated response provided by Test Agent2 is also provided in two discrete responses. In contrast, the simulated response provided by Test Agent1 is provided in a single response.

FIG. 4 shows that simulated chat conversations 400 are associated with simulated conversation data 407. Simulated conversation data 407 includes a simulated response "test from Agent's side #sleep=10000" provided by an agent-side simulator. The simulated response includes control command "#sleep=10000." The control command instructs the user-side simulator to insert a delay of 10 seconds before transmitting a submission.

Simulated conversation data 407 shows that the simulated response was provided by agent-side simulator at [3:50:37 PM]. A first simulated submission "test from the customer's side" is provided by the user-side simulator 10 seconds later at [3:50:47 PM]. A second simulated submission "hello" is provided by the user-side simulator at [3:50:57 PM] which is 10 seconds after transmission of the first submission and in accordance with the control command #sleep=10000 provided by the agent-side simulator.

Agent interface 401 also includes manual input screen 411. Manual input screen 411 allows for an agent response to be entered manually. The manually entered agent response may include a response configuration. The manually entered agent response may override any response configurations currently in effect for an ongoing and simulated chat conversation.

Figure 5:
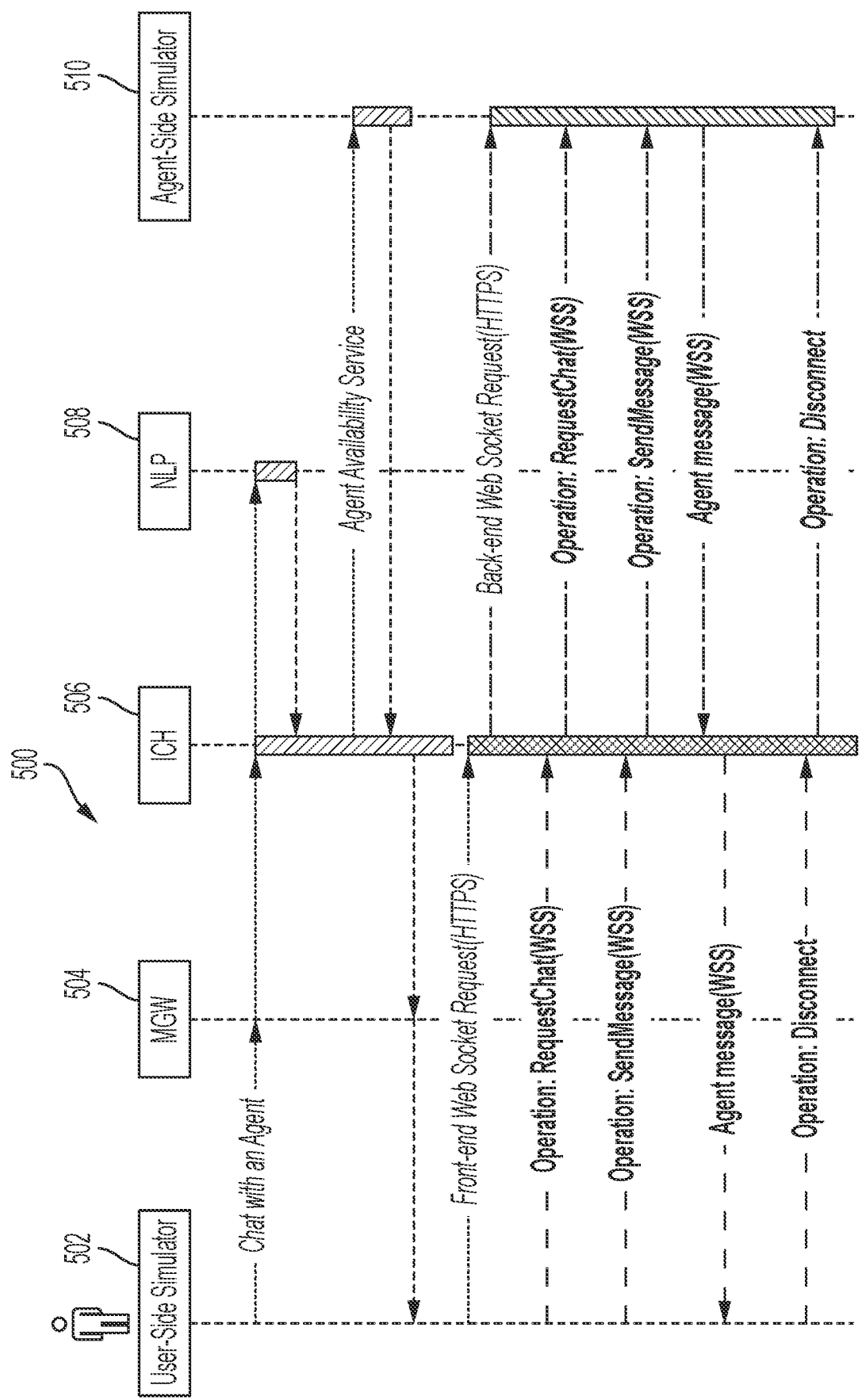
FIG. 5 illustrative operation of a system in accordance with principles of the disclosure.

FIG. 5 shows illustrative bi-directional data flow 500 through components of a chatbot system. Process flow 500 may be conducted over a full-duplex communication channel. Process flow 500 shows a flow of user submissions generated by user-side simulator 502 and provided to agent-side simulator 510. Process flow 500 also shows a flow of simulated agent responses generated by agent-side simulator 510 and provided to user-side simulator 502.

Simulated user submissions generated by user-side simulator 502 may be mediated by mobile gateway 504. An AI engine (not shown) may monitor traffic and bandwidth capacity on the full-duplex communication channel. The AI engine may control submissions generated by user-side simulator 502. The AI engine may control responses generated by agent-side simulator 510. AI engine may coordinate performance testing of the chatbot system components shown in FIG. 5.

Performance testing may determine whether the chatbot system is fast enough to handle threshold volumes of user/agent data traffic. For example, the AI engine may initiate hundreds, thousands, tens-of-thousands or millions of test users that each initiate a chat conversation to measure the data throughput across the chatbot system. The AI engine may measure the data throughput across the chatbot system by controlling how much data is sent between user-side simulator 502 and agent-side simulator 510.

The AI engine may track data transmitted by user-side simulator 502 and data received by agent-side simulator 510. The AI engine may track response data generated by agent-side simulator 510 and transmitted to user-side simulator 502. The AI engine may track whether simulated agent responses are successfully generated and transmitted within a target time window. Such a time window may be defined by control commands in a user submission. The AI engine may determine how much data throughput the chatbot system can handle without dropping data packets.

Illustrative chatbot system components that may be monitored during such performance testing include mobile gateway 504. User-side simulator 501 and agent-side simulator 510 may generate agent responses that test performance of Mobile gateway, 504, intelligent conversation hub 506, natural language processor 508 and communication channels linking these components.

Mobile gateway 504 may be an internal enterprise application that exposes web services to a user mobile application. In a production environment, the user mobile application may provide user access to the chatbot system and occupy the position of user-side simulator 502 within flow 500. Mobile gateway 504 may provide user authentication and protection for enterprise systems.

Illustrative chatbot system components that may be monitored during performance testing include intelligent conversation hub ("ICH") 506 and natural language processor 508. ICH 506 may be a front facing web application for a chatbot system. ICH 506 may access natural language processor ("NLP") 508 to determine user intent from user inputs. For example, if a user enters "I need help with a dispute," NLP 508 may understand the intent as "need assistance" and the topic/entity as "filing a dispute."

ICH 506 may receive a user request for a transfer to a live agent. In a production environment, ICH 506 may access an agent availability service to identify an agent at an agent interface. In a production environment, the agent interface may occupy the position of agent-side simulator 510. In the productions environment, the agent interface may be a customer response management system such as Genesys mobile services, produced by Genesys Telecommunications Laboratory, Inc.

ICH 506 may orchestrate a protocol handshake and pass context or history of prior session activity (for transfer to a live agent or in simulated embodiments that includes session handling) to a live agent. The handshake may include a Hypertext Transfer Protocol Secure ("HTTPS") request and may enable the server to handle HTTPS and WebSocket ("WSS") connections on the same port. Once the connection is established, communication between the user-side and agent-side may switch to WSS protocols. WSS protocols may enable interaction between a client application and a web server using a bidirectional binary protocol, which does not conform to HTTPS protocol.

Figure 6:
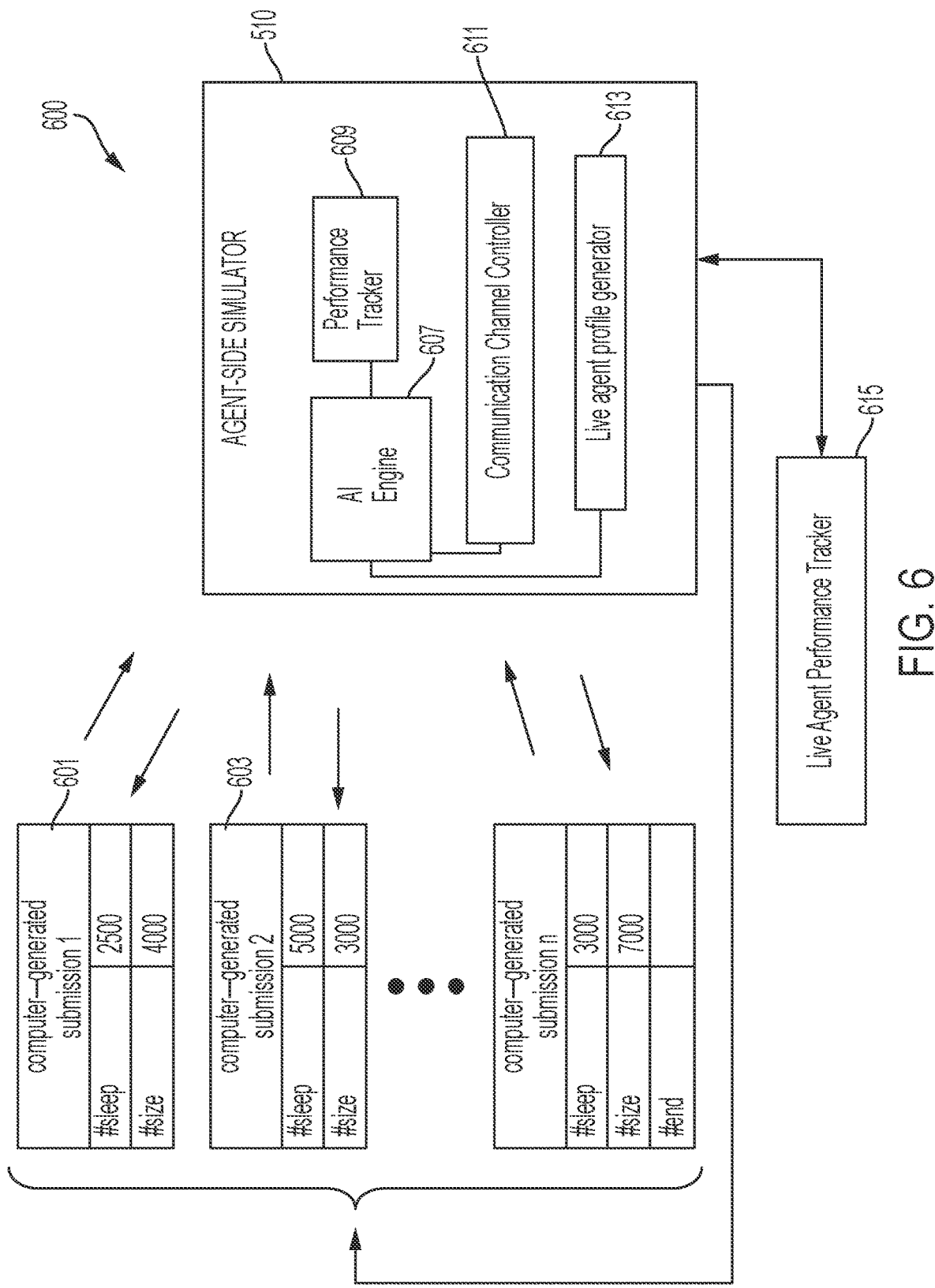
FIG. 6 illustrative operation of a system in accordance with principles of the disclosure.

FIG. 6 shows illustrative system 600. System includes submission 601. Submission 601 may be generated by user-side simulator 502 (shown in FIG. 5). During a performance test of a chatbot system (illustrative components of such a chatbot system are shown in FIG. 5), submission 601 may be transmitted through the chatbot system to agent-side simulator 510. Agent-side simulator 510 may generate a response to submission 601 in accordance with control commands included in submission 601. AI engine 607 may control overall operation of agent-side simulator 510.

FIG. 6 shows that submission 601 includes illustrative control commands #sleep 2500 and #size 4000. Control command #sleep 2500 defines a time delay in milliseconds (e.g., 2.5 seconds) agent-side simulator 510 will wait before responding to submission 601. Control command #size 4000 defines a size of a data payload in bytes (e.g., 4 kilobytes) that will be included in a response to submission 601 generated by agent-side simulator 510.

Agent-side simulator 510 may also generate a response to submission 603 in accordance with control commands included in submission 603. FIG. 6 shows that any suitable number of simulated user submissions may be transmitted to agent-side simulator 510.

Agent-side simulator 510 may not provide session handling functionality. Agent-side simulator 510 may respond to each submission received from user-side simulator 502 without applying any session handling. In response to each received submission, agent-side simulator 510 may return a response right away. Without the computational overhead of session handling, agent-side simulator 510 may consume little computing resources and provide adequate testing of chatbot system components shown in FIG. 5.

In simulated embodiments without session handling, performance tracker 609 may monitor chatbot system components to determine whether data flowing through those components overloads any of the components' data processing capacity. If a components data processing capacity is overloaded (e.g., causing the component to crash or drop data packets) even without session management, certainly those components would not be able to process live chat conversation that include the overhead of session handling.

Agent-side simulator 510 may include communication channel controller 611. Controller 611 may throttle performance characteristics of agent-side simulator 510. Illustrative performance characteristics include time delay between receiving a submission and transmitting a response, delay before transmitting an indication that an agent has started typing a response to a received submission and size of a simulated response.

Agent-side simulator 510 also includes live agent profile generator 613. Profile generator 613 may generate an agent profile. The agent profile may be generated based on live agent activity captured by live agent performance tracker 615. A generated agent profile may include a set of performance characteristics that define how a live agent may respond to received submissions.

An illustrative agent profile may define a speed at which simulated chatbot responses are transmitted after receiving a submission. The agent profile may define an amount of data included in each chatbot response. Agent-side simulator 510 may generate simulated responses that test whether a chatbot system can process simulated chatbot conversations in accordance with a target agent profile.

Thus, methods and apparatus for an AGENT-SIDE CHATBOT SIMULATOR WITH THROTTLING CAPABILITIES are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. An agent-side simulator for automated testing response performance of a chatbot, the simulator comprising computer executable instructions stored on a non-transitory computer readable medium, that when executed by a processor on a computer system:
   receive a submission from a simulated test user;
   determine a response configuration based on the submission; and
   generate a simulated chatbot response based on the response configuration and thereby simulate interaction with the simulated test user;
wherein:
   the submission is one of a plurality of submissions received from the simulated test user;
   the simulated chatbot response is one of a plurality of simulated chatbot responses;
   the plurality of submissions received from the simulated test user and the plurality of simulated chatbot responses collectively simulate a chatbot conversation; and
   the response configuration associated with the chatbot conversation defines:
      a speed at which each member of the plurality of simulated chatbot responses is provided after receiving a corresponding member of the plurality of submissions received from the simulated test user; and
      an amount of data included in each member of the plurality of simulated chatbot responses.

2. The agent-side simulator of claim 1 further comprising a computer communications protocol that provides full-duplex communication channels over a single TCP connection;
   wherein the agent-side simulator:
      receives the submission using the computer communications protocol; and
      provides the simulated chatbot response to the simulated test user using the computer communications protocol.

3. The agent-side simulator of claim 1 wherein the computer executable instructions, when executed by the processor on the computer system opens a discrete connection for responding to the submission, and after transmitting the simulated chatbot response to the submission, closes the discrete connection.

4. The agent-side simulator of claim 1 wherein the submission is one of a plurality of submissions received from a plurality of simulated test users and the computer executable instructions, when executed by the processor on the computer system, for each of the plurality of submissions received from the plurality of simulated test users:
   opens a discrete connection for responding to each of the plurality of submissions received from the plurality of simulated test users; and
   after transmitting the simulated chatbot response for each of the plurality of submissions received from the plurality of simulated test users, closes the discrete connection.

5. The agent-side simulator of claim 4 wherein:
   opening and closing the discrete connection for each of the plurality of submissions received from the plurality of simulated test users reduces processing power consumed by the computer system and allows the simulator to respond to a threshold number of submissions;
   the threshold number of submission exceeds a maximum number of default submissions the chatbot is configured to process; and
   each default submission is associated with a target response configuration.

6. The agent-side simulator of claim 5 wherein, collectively, response configurations associated with the plurality of submissions received from the plurality of simulated test users overload the chatbot.

7. The agent-side simulator of claim 6 wherein the response configurations associated with the plurality of submissions received from the plurality of simulated test users overload the chatbot by causing the chatbot to receive more than a threshold limit of data per second, which in turn, causes the chatbot to drop at least one of the plurality of submissions received from the plurality of simulated test users.

8. The agent-side simulator of claim 4, wherein each of the plurality of submissions received from the plurality of simulated test users are auto-generated by a user-side simulator.

9. The agent-side simulator of claim 8, wherein the user-side simulator applies an artificial intelligence model to auto-generate the plurality of submissions received from the plurality of simulated test users that include mimicking human user interaction with the chatbot.

10. The agent-side simulator of claim 8, wherein the user-side simulator applies an artificial intelligence model to auto-generate the response configuration for each of the plurality of submissions received from the plurality of simulated test users such that the simulated chatbot response provided to each of the plurality of submissions received from the plurality of simulated test users simulates behavior of a human agent.

11. A computer executable method for simulating testing of chatbot response performance, the method comprising extracting computer readable instructions stored on a non-transitory computer readable medium and executing the computer readable instructions on a processor, wherein execution of the computer readable instructions by the processor:
   receives a computer-generated submission that triggers a simulated chatbot conversation;
   extracts, a response configuration from the computer-generated submission; and
   generates a simulated chatbot response to the computer-generated submission by throttling the simulated chatbot conversation based on the response configurations;
wherein:
   the submission is one of a plurality of computer-generated submissions;
   the simulated chatbot response is one of a plurality of simulated chatbot responses;
   the plurality of computer-generated submissions and the plurality of simulated chatbot responses collectively simulate the simulated chatbot conversation; and
   the response configuration associated with the simulated chatbot conversation defines:
      a speed at which each member of the plurality of simulated chatbot responses is provided after receiving a corresponding member of the plurality of computer-generated submissions; and
      an amount of data included in each member of the plurality of simulated chatbot responses.

12. The computer executable method of claim 11 wherein the response configuration defines a delay between receiving the computer-generated submission and transmission of the simulated chatbot response.

13. The computer executable method of claim 12 wherein the computer-generated submission is a first computer-generated submission, and the response configuration extracted from the first computer-generated submission defines the delay based on a duration of time between receiving the first computer-generated submission and receiving a second computer-generated submission.

14. The computer executable method of claim 11 wherein the response configuration defines a delay between receiving the computer-generated submission and initiating transmission of a preliminary response comprising an agent activity status.

15. The computer executable method of claim 11 wherein the response configuration defines a delay based on a size of the computer-generated submission.

16. The computer executable method of claim 11 wherein the response configuration comprises an instruction to end the simulated chatbot conversation.

17. A development environment for simulating performance of a chatbot, the development environment comprising computer executable instructions stored on a non-transitory computer readable medium, that when executed by a processor on a computer system:
   receives a simulated submission from an input generator;
   opens a communication channel to the input generator;
   determines a response profile based on content of the simulated submission;
   generates a simulated chatbot response based on the response profile; and
   closes the communication channel;
wherein:
   the simulated submission is one of a plurality of simulated submissions;
   the simulated chatbot response is one of a plurality of simulated chatbot responses;
   the plurality of simulated submissions and the plurality of simulated chatbot responses collectively simulate a chatbot conversation; and
   the response profile associated with the chatbot conversation defines:
      a speed at which each member of the plurality of simulated chatbot responses is provided after receiving a corresponding member of the plurality of simulated submission; and
      an amount of data included in each member of the plurality of simulated chatbot responses.

18. The development environment of claim 17, wherein the plurality of simulated submissions and the plurality of simulated chatbot responses collectively simulate a human-to-human chatbot conversation.

19. The development environment of claim 17, wherein the plurality of simulated submissions and the plurality of simulated chatbot responses collectively simulate a human-to-machine chatbot conversation.

* * * * *